United States Patent
Xu

(10) Patent No.: US 10,728,212 B2
(45) Date of Patent: Jul. 28, 2020

(54) METHOD, DEVICE AND SYSTEM OF FORWARD ADDRESSING AND BACKWARD READDRESSING INTERCONNECT

(71) Applicants: ADHOCLINK TECHNOLOGIES WUHAN INC., Wuhan, Hubei (CN); Jing Xu, Wuhan, Hubei (CN)

(72) Inventor: Jing Xu, Hubei (CN)

(73) Assignees: ADHOCLINK TECHNOLOGIES WUHAN INC., Wuhan (CN); Jing Xu, Wuhan (CN)

( * ) Notice: Subject to any disclaimer, the term of this patent is extended or adjusted under 35 U.S.C. 154(b) by 0 days.

(21) Appl. No.: 16/508,269

(22) Filed: Jul. 10, 2019

(65) Prior Publication Data

US 2019/0334861 A1    Oct. 31, 2019

Related U.S. Application Data

(63) Continuation of application No. PCT/CN2018/074505, filed on Jan. 29, 2018.

(30) Foreign Application Priority Data

Feb. 27, 2017 (CN) .......................... 2017 1 0105738
Mar. 5, 2017 (CN) .......................... 2017 1 0125998

(51) Int. Cl.
*H04L 29/12* (2006.01)

(52) U.S. Cl.
CPC .......... *H04L 61/25* (2013.01); *H04L 61/6022* (2013.01)

(58) Field of Classification Search
CPC .  H04L 61/25; H04L 61/6022; H04L 67/2814; H04L 67/2809; H04L 67/104
See application file for complete search history.

(56) References Cited

U.S. PATENT DOCUMENTS

| | | | |
|---|---|---|---|
| 2004/0249975 A1* | 12/2004 | Tuck ................... | H04L 61/1511 709/245 |
| 2014/0229612 A1* | 8/2014 | Chandrashekar ....... | H04L 41/12 709/224 |
| 2018/0241669 A1* | 8/2018 | Muscariello ........ | H04L 61/2503 |

FOREIGN PATENT DOCUMENTS

| | | |
|---|---|---|
| CN | 101674633 A | 3/2010 |
| CN | 101950175 A | 1/2011 |
| CN | 106878440 A | 6/2017 |

* cited by examiner

*Primary Examiner* — Thai Nguyen
(74) *Attorney, Agent, or Firm* — Wayne & Ken, LLC; Tony Hom

(57) ABSTRACT

The disclosure belongs to wireless communication technology, and the provided method, device and system of Forward Addressing and Backward Readdressing InterConnect (FABRIC) including, the method of forward addressing and backward readdressing interconnect enables any two devices in the system to establish interconnection channels when data exchange is required, and screens out suitable relay devices among the numerous intermediate devices between the two devices, the transmission of data is controlled within a limited range, and the interconnection channel is not unique, each time of data transmission is likely to pass through different intermediate devices with randomness and redundancy, it can cope with a certain degree of device movements. A plurality of devices can carry out communication between two at the same time without conflict.

19 Claims, 7 Drawing Sheets

METHOD, DEVICE AND SYSTEM OF FORWARD ADDRESSING AND BACKWARD READDRESSING INTERCONNECT

CROSS-REFERENCE TO RELATED APPLICATIONS

This application is a continuation of International Application No. PCT/CN2018/074505, filed on Jan. 29, 2018, which claims priority from Chinese Patent Application No. 201710105738.8, filed on Feb. 27, 2017 and No. 201710125998.1, filed on Mar. 5, 2017, all of which are hereby incorporated by reference in their entireties.

TECHNICAL FIELD

The disclosure relates to a wireless communication method, device and system, in particular to a wireless communication method, device and a system for peer to peer establishing an interconnection channel by adopting addressing between any two devices through intermediate devices.

BACKGROUND OF THE DISCLOSURE

Communication methods are diversified from the wired communication to the wireless communication, transmitting the voice, the image, the video, the text message and the data file, which enables communication between people to become more convenient. The traditional voice communication is completely transited from an analog manner to a digital manner. The development of the digital technology makes the transmission of all information to a transmission process of bit zero and bit one. The emergence of Ethernet technology connects computers which work independently to form a local area network capable of sharing information resources. Furthermore, on the basis of the Ethernet, the Internet connects computers around the world together. The technologies such as the wireless local area network WLAN, the Bluetooth, the Zigbee liberate people from the bondage of wire harness. With the boost of mobile digital communication technology, people working, communicating and obtaining information in the mobile manner is common these days. With the improvement of the intelligent degree, the wireless communication technology is widely applied to various industries and is developed from connecting people to connecting anything.

The Internet of Things emerges as the times require, from smart home, smart transportation, smart workshop, smart warehouse to any intelligent application that can be imagined, the need of interconnection between things can be seen, wireless communication technology is being further developed to adapt to this change.

The wireless local area network WLAN is not suitable for object-to-object interconnection mainly because it is based on a star network topology architecture taking an AP as a center and based on a TCP/IP protocol which requires an IP address to be configured. The former factor leads to the inability of direct connection between devices, although WLAN also supports Mesh multi-hop network architecture, it still needs to connect into AP eventually. The complexity of the latter factor makes it impossible to complete without human participation, and the communication distance of AP is limited, It is difficult to manage the movement of mobile devices from one AP region to another AP region. Even for a fixed device, such as a simple application like transferring a file from a mobile phone to a tablet computer, the manual operation complexity is large. WiFi Direct technology developed by WiFi Alliance can realize point-to-point communication between two devices, but it still cannot solve the interconnection problem of automatic networking of multiple devices, especially mobile devices.

Compared with WLAN, Bluetooth has a narrow communication bandwidth, and mainly based on point-to-point topology architecture, it can form a very small number range of micro-networks Piconet, and then a plurality of Piconets are connected to form a Scatternet. Bluetooth has the advantages of being high in security and low in power consumption, and the developed Bluetooth Smart technology has the advantages that the power consumption is reduced to be lower, and the communication distance is longer. Bluetooth communication needs to be paired firstly, and is not suitable for random connection between objects.

From the perspective of network topology architecture, Zigbee ad hoc network functions and dynamic routing methods adopt multi-hop communication and can meet the requirement that device temporarily joins the network. It can adapt to a large number of device networking communications. However, it is based on a starting point of the establishment and management of a network, the maintenance of routing is relatively complex, and there is no reciprocity between devices.

Examining the existing wireless communication technology, there is single-hop communication based on point-to-point topology architecture or star-shaped architecture, or multi-hop communication similar to Zigbee. Some can enable communication between a plurality of devices, but the devices are not equal and the number of devices capable of being connected is also limited, it is difficult to add a new device, especially mobile devices which are hard to manage.

From the perspective of equality of all things, the communication network between objects should be a reciprocal network, wherein each device is in an equal position. The communication between devices is simple and direct, just like the communication between people, through inquiry and greeting. A device exchanges information with another device beyond its effective communication distance, by forwarding information through adjacent devices, each device can be either an initiator of a communication transaction or an accessed target or a forwarder in another communication transaction.

SUMMARY OF THE DISCLOSURE

The disclosure aims to realize interconnection between things and provides a method, a device and a system for wireless communication with the electromagnetic wave as a medium between any two of the things, all devices in the system are in a equal position, and no base station or central access point is needed. Within an effective communication distance, two devices communicate directly, while beyond the effective communication distance, the two devices communicate through intermediate relay devices. All devices do not need to record complex communication routing information, in the process of communication, certain device movement changes can be adapted.

In order to achieve the aim, the disclosure is based on each device having a globally unique identity identification number called a MAC address, the disclosure provides a method of forward addressing and backward readdressing interconnect, including:

a transaction initiator and a destination device are communicated through a wireless signal using the electromagnetic wave as a medium, including an addressing stage and a data stage, wherein said addressing stage includes the following steps:

S1, said transaction initiator sending a forward addressing frame with a MAC address of said destination device, wherein said MAC address of said destination device is referred to as DA, a MAC address of said transaction initiator, wherein said MAC address of said transaction initiator is referred to as SA, and a transaction event identification, wherein said transaction event identification is referred to as TID; intermediate devices receiving and forwarding said forward addressing frame; said forward addressing frame further containing a forward address, wherein said forward address is referred to as FA, setting FA every time when said forward addressing frame passing through a device by taking said transaction initiator as an addressing starting point according to an addressing strategy, a device which is passed through by said forward addressing frame recording values corresponding to DA, SA, TID and FA in a local storage; and any device only accepting said forward addressing frame with the same DA, SA, TID once;

S2, after said destination device receiving said forward addressing frame, sending a backward readdressing frame with the same DA, SA, TID and a corresponding locally stored FA; an intermediate device, whose corresponding locally stored DA, SA, TID are matching and corresponding FA comparing with that of in said backward readdressing frame is as that of in a next upper level, forwarding said backward readdressing frame, before forwarding, a FA in the frame is replaced by a locally stored FA; said transaction initiator receiving said backward readdressing frame; said backward readdressing frame further containing a backward address, wherein said backward address is referred to as BA, setting BA every time when said backward readdressing frame passing through a device by taking said destination device as an addressing starting point according to said addressing strategy, a device which is passed through by said backward readdressing frame correspondingly recording a value of BA in a local storage; and any device only accepting said backward readdressing frame with the same DA, SA and TID once.

Preferably, said transaction event identification TID is a random number of 48-bit length generated by said transaction initiator before sending said forward addressing frame; said forward addressing frame and said backward readdressing frame further containing a MAC address of a transmitting device, wherein said MAC address of said transmitting device is referred to as TA; and the step S2 further comprises: an intermediate device, which is adjacent to said destination device and has a same FA as said destination device and whose corresponding locally stored DA, SA and TID are matching, forwarding said backward readdressing frame; an intermediate device, which is at a next lower level of said FA of said transaction initiator and whose corresponding locally stored DA, SA and TID are matching, forwarding said backward readdressing frame to an intermediate device, which is also at a next lower level_of said FA of said transaction initiator and has a same level FA thereof.

Preferably, said addressing strategy is that: a length of an address is 16 bits, an address of a device of an addressing starting point is 1, and the address is circularly left shifted by one bit each time after passing through a device.

Preferably, said data stage includes the following steps:

S3, after said transaction initiator receiving said backward readdressing frame, sending a data frame with corresponding the same DA, SA, TID as said forward addressing frame and a corresponding BA stored locally; said data frame further containing a data frame sequence number TXn, a device that is passed through by said data frame recording a value of the TXn in a local storage; an intermediate device, whose locally stored BA comparing with that of in the frame is as that of in the next upper level and locally stored DA, SA, TID are matching and a corresponding TXn is just smaller than that of in the frame by 1, receiving and forwarding said data frame, before forwarding, a BA in the frame is replaced by a locally stored BA; said destination device receiving said data frame; and any device only accepting said data frame with the same DA, SA, TID and TXn once;

S4, after said destination device receiving said data frame, sending a data response frame with the same DA, SA, TID and a corresponding locally stored FA; said data response frame further containing a data response frame sequence number RXn, and the RXn is consistent with a TXn of the corresponding said data frame, a device that is passed through by said data response frame correspondingly recording a value of the RXn in a local storage; an intermediate device, whose locally stored FA comparing with that of in the frame is as that of in the next upper level and corresponding locally stored DA, SA, TID are matching and corresponding RXn is just smaller than that of in the frame by 1, receiving and forwarding said data response frame, before forwarding, a FA in the frame is replaced by a locally stored FA; said transaction initiator receiving said data response frame; and any device only accepting said data response frame with the same DA, SA, TID and RXn once;

S5, under the same said transaction event identification TID, the operations mentioned in the steps S3 and S4 can be continuously performed for multiple times, and 1 is added to the TXn every time before S3 is performed.

Further preferably, a length of said data frame sequence number TXn and a length of said data response frame sequence number RXn are 16 bits, $0 \leq TXn < 2^{16}-1$, $0 \leq RXn < 2^{16}-1$, and said transaction initiator setting TXn from 1 for sending said data frame; said data frame and said data response frame further containing a MAC address of a transmitting device TA; said data frame and said data response frame can select whether a datagram is carried, a length of the datagram is variable of 0-64 kilobit;

in addition, the step S3 further comprises: an intermediate device, which is adjacent to said transaction initiator and has a same BA as said transaction initiator and whose locally stored DA, SA, TID are matching and corresponding TXn is just smaller than that of in the frame by 1, forwarding said data frame; an intermediate device, which is at a next lower level of said destination device BA and whose locally stored DA, SA, TID are matching and corresponding TXn is just smaller than that of in the frame by 1, forwarding said data frame to the intermediate device with a same level BA thereof; and the step S4 further comprises: an intermediate device, which is adjacent to said destination device and has a same FA as said destination device and whose corresponding locally stored DA, SA, TID are matching and corresponding RXn is just smaller than that of in the frame by 1, forwarding said data response frame; an intermediate device, which is at a next lower level of said transaction initiator FA and whose corresponding locally stored DA, SA, TID are matching and corresponding RXn is just smaller than that of in the frame by 1, forwarding said data response frame to an intermediate device with a same level FA thereof.

According to another aspect of the disclosure, the provided device of forward addressing and backward readdressing interconnect includes: a data processing module, a frame sending module, a frame receiving module and a wireless transceiver, wherein said data processing module, configured to process data, and transmit the data needing to be sent to said frame sending module after grouping the data into frames by category; receive various categories of frames from said frame receiving module, and analyze out data, or transmit a frame correspondingly generated for response to said frame sending module, or transmit a frame correspondingly generated for forwarding to said frame sending module;

said frame sending module, configured to receive various categories of frames from said data processing module and add the frames into a sending queue, and send frames in sequence through said wireless transceiver;

said frame receiving module, configured to receive various categories of frames from said wireless transceiver and add the frames into a receiving queue, and transmit frames in sequence to said data processing module for analysis;

said wireless transceiver, configured to send out various categories of frames from said frame sending module through an antenna by means of an electromagnetic wave signal; receive an electromagnetic wave signal from the antenna and analyze out various categories of frames for transmitting to said frame receiving module;

when the transaction initiator and the destination device communicate with each other by means of a wireless signal using an electromagnetic wave as a medium, comprising an addressing stage and a data stage; in said addressing stage, said data processing module includes:

when a device serves as said transaction initiator, a forward addressing frame with a MAC address of said destination device DA, a MAC address of said transaction initiator SA and a transaction event identification TID, is generated and is sent via said frame sending module and said wireless transceiver; when a device serves as an intermediate device, said forward addressing frame is received and forwarded; said forward addressing frame further contains a forward address FA, and the FA is set once at the time of initiating or receiving said forward addressing frame by taking said transaction initiator as an addressing starting point according to an addressing strategy, and values corresponding to DA, SA, TID and FA is recorded in a local storage; said forward addressing frame with the same DA, SA and TID is only accepted once; and when a device serves as said destination device, after receiving said forward addressing frame via said wireless transceiver and said frame receiving module, a backward readdressing frame with the same DA, SA, TID and a corresponding locally stored FA, is generated and is sent out via said frame sending module and said wireless transceiver; when a device serves as an intermediate device, whose corresponding FA comparing with that of in said backward readdressing frame is as that of in the next upper level and corresponding locally stored DA, SA, TID are matching, said backward readdressing frame is forwarded, before forwarding, a FA in the frame is replaced by a locally stored FA; when a device serves as transaction initiator, said backward readdressing frame is received; said backward readdressing frame further contains a backward address BA, and the BA is set once at the time of initiating or receiving said backward readdressing frame by taking said destination device as an addressing starting point according to said addressing strategy, and a value of BA is correspondingly recorded in a local storage; said backward readdressing frame with the same DA, SA and TID is only accepted once.

Preferably, in said addressing stage, said data processing module further includes: said transaction event identification TID is a random number of 48-bit length generated by said transaction initiator before sending said forward addressing frame; said forward addressing frame and said backward readdressing frame further contains a MAC address of a transmitting device TA; and when a device serves as an intermediate device, which is adjacent to said destination device and has a same FA as said destination device and whose corresponding locally stored DA, SA, TID are matching, said backward readdressing frame is forwarded; when a device serves as an intermediate device, which is at a next lower level of said transaction initiator FA and whose corresponding locally stored DA, SA, TID are matching, said backward readdressing frame is forwarded to an intermediate device, which is also at the next lower level of said transaction initiator FA and has a same level FA thereof.

Preferably, said addressing strategy is that: a length of an address is 16 bits, an address of a device of an addressing starting point is 1, and the address is circularly left shifted by one bit each time after passing through a device.

Preferably, in said data stage, said data processing module includes:

when a device serves as said transaction initiator and receives said backward readdressing frame, a data frame with corresponding the same DA, SA, TID as said forward addressing frame and a corresponding locally stored BA, is generated and is sent out via said frame sending module and said wireless transceiver; said data frame further contains a data frame sequence number TXn, when said data frame is initiated or received, a value of the TXn is recorded in a local storage; when a device serves as an intermediate device, whose locally stored BA comparing with that of in the frame is as that of in the next upper level and locally stored DA, SA, TID are matching and corresponding TXn is just smaller than that of in the frame by 1, said data frame is received and forwarded, before forwarding, a BA in the frame is replaced by a locally stored BA; when a device serves as said destination device, said data frame is received; and said data frame with the same DA, SA, TID and TXn is only accepted once; and when the device serves as said destination device and receives the data frame, a data response frame with the same DA, SA, TID and a corresponding locally stored FA, is generated and is sent out via said frame sending module and said wireless transceiver; said data response frame further contains a data response frame sequence number RXn, and the RXn is consistent with a TXn of the corresponding said data frame, when said data response frame is initiated or received, a value of the RXn is correspondingly recording in a local storage; when a device serves as an intermediate device, whose locally stored FA comparing with that of in the frame is as that of in the next upper level and corresponding locally stored DA, SA, TID are matching and corresponding RXn is just smaller than that of in the frame by 1, said data response frame is received and forwarded, before forwarding, a FA in the frame is replaced by a locally stored FA; when a device serves as said transaction initiator, said data response frame is received; and said data response frame with the same DA, SA, TID and RXn is only accepted once; and under the same said transaction event identification TID, the above operations can be continuously performed for multiple times, and 1 is added to the TXn every time before performing.

Further preferably, in said data stage, said data processing module further comprises: a length of said data frame sequence number TXn and a length of said data response frame sequence number RXn are 16 bits, $0<TXn<2^{16}-1$, $0 \leq RXn<2^{16}-1$, and said transaction initiator sets TXn from 1 for sending out said data frame; said data frame and said data response frame further contain a MAC address of a transmitting device TA; said data frame and said data response frame can select whether a datagram is carried, a length of the datagram is variable of 0-64 kilobit;

in addition, when a device serves as an intermediate device, which is adjacent to said transaction initiator and has a same BA as said transaction initiator and whose locally stored DA, SA, TID are matching and corresponding TXn is just smaller than that of in the frame by 1, said data frame is forwarded; when a device serves as an intermediate device, which is at a next lower level of said destination device BA and whose locally stored DA, SA, TID are matching and corresponding TXn is just smaller than that of in the frame by 1, said data frame is forwarded to an intermediate device with a same level BA thereof; and when a device serves as an intermediate device, which is adjacent to said destination device and has a same FA as said destination device and whose corresponding locally stored DA, SA, TID are matching and corresponding RXn is just smaller than that of in the frame by 1, said data response frame is forwarded; when a device serves as an intermediate device, which is at a next lower level of said transaction initiator FA and whose corresponding locally stored DA, SA, TID are matching and corresponding RXn is just smaller than that of in the frame by 1, said data response frame is forwarded to an intermediate device with a same level FA thereof.

As yet another aspect of the disclosure, the provided system of forward addressing and backward readdressing interconnect includes: at least two devices of forward addressing and backward readdressing interconnect mentioned above.

The method, device and system of Forward Addressing and Backward Readdressing InterConnect (FABRIC) provided by the disclosure, and the method of forward addressing and backward readdressing interconnect enables any two devices in the system to establish interconnection channels when data exchange is required, and screens out suitable relay devices among the numerous intermediate devices between the two devices, the transmission of data is controlled within a limited range, and the interconnection channel is not unique, each time of data transmission is likely to pass through different intermediate devices with randomness and redundancy, it can cope with a certain degree of device movements. A plurality of devices can carry out communication between two at the same time without conflict. The devices are completely equal, there is no need for base station or central access point, no need for configuration, and data transactions can be initiated at any time. If the disclosure is applied to mobile phones, electrical appliances, automobiles, street lamps and the like, the whole city and even a plurality of cities will be woven in an internet of things manner.

DETAILED DESCRIPTION OF EMBODIMENTS

Figure 1:
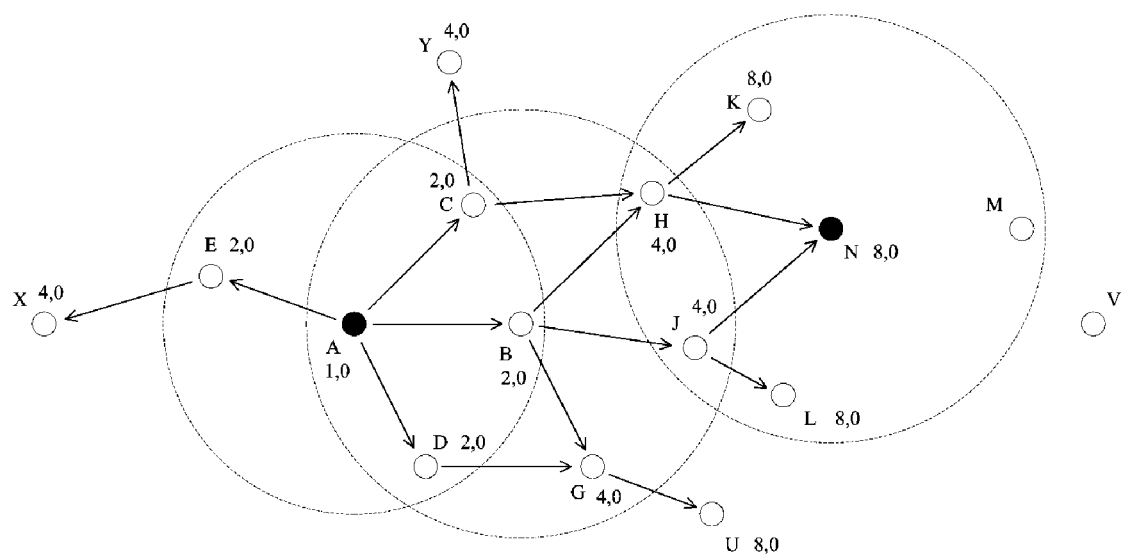
FIG. 1 is a schematic diagram of a transmission process of a forward addressing frame communicating between two devices.

In order to enable the technical solution and the advantages of the disclosure to be clearer, the embodiments of the disclosure are described in further detail below with reference to the embodiments and the accompanying drawings. It should be understood that the specific embodiments described herein are only used to explain the disclosure and are not intended to limit the disclosure.

In one aspect of the disclosure, an embodiment of a method of forward addressing and backward readdressing interconnect is provided, a transaction initiator communicates with a destination device through a wireless signal, and starting from an addressing stage, including the transaction initiator sending a forward addressing frame and the destination device responding with a backward readdressing frame.

A transaction that setting the MAC address of the destination device to all 1 is excluded from the description below, such transaction is regarded as a mass sending to all adjacent devices, and each adjacent device receives a datagram in a frame.

A forward addressing frame sent by the transaction initiator as an addressing starting point device includes a plurality of fields, wherein containing a 16-bit frame type FT, a MAC address of a destination device DA, a MAC address of a transaction initiator SA, a MAC address of a transmitting device TA, a 48-bit transaction event identification TID, a 16-bit forward address FA, a 16-bit forward hop number FWn and a 16-bit maximum allowable hop number FWmax. The transaction initiator sets each field, the FT is set to represent the forward addressing frame and indicate the lengths of DA, SA, TA are 48 bits or 64 bits respectively, TA=SA, TID is a random number, FA=1, FWn=0, $0<FWmax<2^{16}-1$.

When the transaction initiator sends a forward addressing frame, a set of data of DA_L、SA_L、TID_L、FA_L、BA_L、TXn_L、RXn_L、BR_flag_L is recorded in a local storage, the front four respectively correspond to DA, SA, TID and FA in the forward addressing frame, wherein DA_L、SA_L are 64-bit lengths and are 64-bit extension of DA and SA respectively, if DA is 64 bits, then DA_L=DA, and if DA is 48 bits, and then the DA_L is the one that supplementing 16 0 in front of the DA, and the relation between the SA_L and the SA is the same, in addition, BA_L、TXn_L、RXn_L are all 16-bit lengths, setting BA_L=TXn_L=RXn_L=0, and BR_flag_L is 1 bit length, and setting BR_flag_L=0.

After any device receiving the forward addressing frame, firstly inquiring whether a matching record corresponding to three data of DA, SA, TID in the forward addressing frame exists in the local storage, if existing, the frame is abandoned, and if not, then compare DA and its own MAC address:

(a) if the DA and its own MAC address are not equal, then continues to compare the FWn and FWmax, if FWn=FWmax, then abandon the frame, if FWn<FWmax, then add one to FWn, and rewrite FWn back to the FWn field of the forward addressing frame, and the TA field is rewritten to its own MAC address, the FT field correspondingly modifies the length indication of the TA, and the FA is circularly left shifted by one bit according to an addressing strategy, and then the forward addressing frame is forwarded out, and meanwhile a 64-bit extension of the DA, a 64-bit extension of the SA, the TID, and a set of data of the updated FA, 0, 0, 0, 0 corresponding to DA_L、SA_L、TID_L、FA_L、BA_L、TXn_L、RXn_L、BR_flag_L are recorded in the local storage.

(b) if the DA is equal to its own MAC address, it is the destination device itself, and then the FA is circularly left shifted by one bit according to the addressing strategy; and a set of data of a 64-bit extension of the DA, a 64-bit extension of the SA, the TID, an updated FA, 0, 0, 0, 0 is recorded in the local storage, and the set of data corresponds to DA_L、SA_L、TID_L、FA_L、BA_L、TXn_L、RXn_L、BR_flag_L; and meanwhile, a backward readdressing frame is sent out by itself as an addressing starting point device.

The backward readdressing frame includes a plurality of fields, wherein including a 16-bit frame type FT, a MAC address of a destination device DA, a MAC address of a transaction initiator SA, a MAC address of a transmitting device TA, a 48-bit transaction event identification TID, a 16-bit forward address FA, a 16-bit backward address BA. The destination device sets each field, and FT is set to represent a backward readdressing frame and indicate the lengths of DA, SA and TA are 48 bits or 64 bits respectively, and DA, SA and TID are the same as the corresponding values in the the forward addressing frame, TA=DA, and FA corresponds to the locally stored FA_L, BA=1. When the destination device sends out a backward readdressing frame, update corresponding locally stored BA_L=1, and BR_flag_L=1.

After any device receives a backward readdressing frame, firstly inquiring whether a matching record corresponding to three data of DA, SA, TID in the backward readdressing frame exists in the local storage, if not, the frame is abandoned, and if existing, then compare whether the corresponding flag bit BR_flag_L in the local storage is 1, if yes, abandoning the frame, and otherwise, continuing to compare SA and its own MAC address:

(c) if the SA and its own MAC address are not equal, then comparing corresponding FA_L in the local storage and the FA in the backward readdressing frame, if the FA_L circularly left shifted by 1 bit is not equal to the FA, then abandoning the frame, and if the FA_L circularly left shifted by 1 bit is equal to the FA, then writing the FA_L to the FA field of the backward readdressing frame, and the BA is rewritten to the BA field of the backward readdressing frame after the BA is circularly left shifted by 1 bit according to the addressing strategy, and the TA field is rewritten by its own MAC address, the FT field is correspondingly modified with the length indication of the TA, then the backward readdressing frame is forwarded, and meanwhile, update BA_L in a set of data of DA_L、SA_L、TID_L、FA_L、BA_L、TXn_L、RXn_L、BR_flag_L in the local storage to be updated BA, the set of data is matching when using three data of DA, SA, TID as an index, and set TXn_L=RXn_L=0, BR_flag_L=1;

(d) if the SA is equal to its own MAC address, then it is the transaction initiator itself, and then the BA is circularly left shifted by 1 bit according to the addressing strategy, and update BA_L in a set of data of DA_L、SA_L、TID_L、FA_L、BA_L、TXn_L、RXn_L、BR_flag_L in the local storage to be updated BA, the set of data is matching when using three data of DA, SA, TID as an index, and set TXn_L=RXn_L=0, BR_flag_L=1.

Wherein BR_flag_L is a processing flag of a backward readdressing frame, setting to be one indicates that the device has processed the backward readdressing frame.

Thus, the addressing stage is completed, and an interconnection channel is established between the transaction initiator and the destination device. The forward addressing frame sent by the transaction initiator is spread out in a flooding manner, the range of the flooding is controlled by the FWn and the FWmax in the frame, and being terminated when FWn=FWmax. The backward readdressing frame is backtracking to the transaction initiator according to the forward address FA, and carrying out backward readdressing on the intermediate devices which are passed through, the backward address BA identifies a limited number of intermediate devices, and these devices are used for transmitting in the data stage. Due to limited wireless signal action range and screening conditions of forward addressing FA, so that the actual transmission range of the backward readdressing frame becomes limited, which is not like the forward addressing frame that forms flooding, so that subsequent data transmission is limited in an interconnection channel composed of a limited number of intermediate devices? After the addressing stage, a device in the interconnection channel has an allocated forward address FA and a backward address BA at the same time, and the FA and the BA are used as criteria for the flow direction of data frame and the data response frame in the subsequent data stage. More than two adjacent intermediate devices may have same forward address FA and backward address BA, so the interconnection channel has multiple paths, and thus, interconnection channel interruption that is caused by the position movement of the intermediate device can be handled to a certain extent.

In addition, in the addressing stage, in order to deal with the position movements of the transaction initiator or the destination device, and a plurality of adjacent intermediate devices of the transaction initiator and the destination device perform the transmission of backward readdressing frame between each other, and specifically includes the following steps: an intermediate device, which is adjacent to the destination device and has a same FA as the destination device and whose corresponding locally stored DA, SA and TID are matching, forwarding the backward readdressing frame; an intermediate device, which is at a next lower level of the transaction initiator FA and whose corresponding locally stored DA, SA and TID are matching, forwarding the backward readdressing frame to an intermediate device, which is also at a next lower level of the transaction initiator FA and has a same level FA thereof;

Next, the transaction initiator performs data stage communication with the destination device through sending data frames, the destination device responds by data response frames, and it can be selected whether a datagram is carried in the data frame and the data response frame. Under the same transaction event identification TID, the data frame and the data response frame can be continuously received and sent for multiple times.

The data frame includes multiple fields, wherein including a 16-bit frame type FT, a MAC address of a destination device DA, a MAC address of a transaction initiator SA, a MAC address of a transmitting device TA, a 48-bit transaction event identification TID, a 16-bit backward address BA, a 16-bit data frame sequence number TXn and a 0-64 kilobit variable-length datagram VLM. The transaction initiator sets each field, the FT is set to represent a data frame and indicate the lengths of DA, SA and TA are 48 bits or 64 bits respectively, and DA, SA and TID are consistent with that of the corresponding forward addressing frame, TA=SA, and BA is the same as BA_L in a set of data of DA_L、SA_L、TID_L、FA_L、BA_L、TXn_L、RXn_L、BR_flag_L in the local storage, the set of data is matching when using three data of DA, SA, TID as an index, set TXn=1, and the VLM is a sending datagram. $0 \leq TXn < 2^{16}-1$, the TXn of the transaction initiator starts from 1. After each data frame is sent by the transaction initiator, set corresponding TXn_L=TXn.

After any device receives the data frame, firstly inquiring whether a matching record corresponding to three data of DA, SA and TID in the data frame exists in the local storage, if not, the frame is abandoned, and if yes, then compare corresponding TXn_L in the local storage and the TXn in the data frame, if TXn_L≠TXn−1, the frame is abandoned, and if TXn_L=TXn−1, then compare DA and its own MAC address:

(a) if the DA and its own MAC address are not equal, and continuously compare the corresponding locally stored BA_L and the BA in the data frame, if the BA_L circularly left shifted by 1 is not equal to the BA, abandoning the frame, and if the BA_L circularly left shifted by 1 is equal to the BA, then the BA_L is written into BA field of the data frame, and set corresponding TXn_L=TXn, and the TA field is rewritten by its own MAC address, the FT field is correspondingly modified of the length indication of the TA, and then forwarding the data frame;

(b) if the DA is equal to its own MAC address, it is the destination device itself, extracting the datagram VLM from the data frame, setting corresponding TXn_L=TXn, and meanwhile, sending a data response frame by taking itself as a initiating device.

The data response frame includes multiple fields, wherein including a 16-bit frame type FT, a MAC address of a transaction initiator SA, a MAC address of a destination device DA, a MAC address of a transmitting device TA, a 48-bit transaction event identification TID, a 16-bit forward address FA, a 16-bit data response frame number RXn and a 0-64 kilobit variable-length data response datagram VLR. The destination device sets each field, the FT is set to represent a data response frame and indicate the lengths of DA, SA and TA are 48 bits or 64 bits respectively, and DA, SA and TID are consistent with that of a corresponding data frame, TA=DA, and FA is the same as FA_L in a set of data of DA_L、SA_L、TID_L、FA_L、BA_L、TXn_L、RXn_L、BR_flag_L in the local storage, the set of data is matching when using three data of DA, SA, TID as an index, the RXn is consistent with the TXn of the corresponding data frame. After each data response frame is sent by the destination device, set corresponding RXn_L=RXn.

After any device receives the data response frame, firstly inquiring whether a matching record corresponding to three data of DA, SA and TID in the data response frame exists in the local storage, if not, the frame is abandoned, and if yes, then compare corresponding RXn_L in the local storage and the RXn in the data response frame, if RXn_L≠RXn−1, the frame is abandoned, and if RXn_L=RXn−1, then compare SA and its own MAC address:

(a) if the SA and its own MAC address are not equal, and continuously compare the corresponding locally stored FA_L and the FA in the data response frame, if the FA_L circularly left shifted by 1 is not equal to the FA, the frame is abandoned, and if the FA_L circularly left shifted by 1 is equal to the FA, then the FA_L is written into FA field of the data response frame, and set corresponding RXn_L=RXn, and the TA field is rewritten by its own MAC address, the FT field is correspondingly modified of the length indication of the TA, and then forwarding the data response frame;

(b) if the SA is equal to its own MAC address, it is the transaction initiator itself, extracting the data response datagram VLR from the data response frame, and setting corresponding RXn_L=RXn.

According to the data volume, under the same transaction event identification TID, the transaction initiator may divides the data into multiple data frames for sending to the destination device, one is added to the TXn every time before a data frame is sent.

Any device which receives a forward addressing frame, or a backward readdressing frame, or a data frame, or a data response frame, can forward the frame or send a response frame, which can also be received by a transmitting device and become an acknowledgement to the transmitting device, so that there is no need to respond all the received frames by means of a special ACK frame, so as to reduce the occupation of the communication channel.

When any device receives a frame, the TA is obtained to know the adjacent devices, and therefore a neighbor device list can be maintained. Further, each device indicates its presence by sending out BEACON frames at a regular interval, so that any device can record the life cycle of neighbor devices.

Any device, which sends a forward addressing frame, or a backward readdressing frame, or a data frame, or a data response frame, can determine that the sending is valid by receiving a frame or a response frame forwarded by all neighbor devices, and if necessary, re-sending can be taken to ensure that all its neighbors receives the frame.

Any device will perform CRC-32 checking on the entire frame of data before sending any frame, and the checking result is attached to the frame tail. When any frame of data is received by any device, firstly performing CRC-32 checking, if the checking fails, abandoning the frame.

Transaction timeout: start timing when any device establishes a set of data of DA_L、SA_L、TID_L、FA_L、BA_L、TXn_L、RXn_L、BR_flag_L in the local storage, and if a corresponding frame which is matched with three data of DA, SA and TID is received again in the time period T1, then the timing is started again, and otherwise, the set of data is cleared from the local storage. $1 \leq T1 \leq 2^{16}-1$, and the unit is millisecond, and a typical value T1=1024 is set. Therefore, the requirement for the storage space by the device can be reduced, so that the forward address FA and the backward address BA exists temporarily, and no trails are reserved after the transaction.

The disclosure is described in more detail below with reference to the accompanying drawings.

Figure 2:
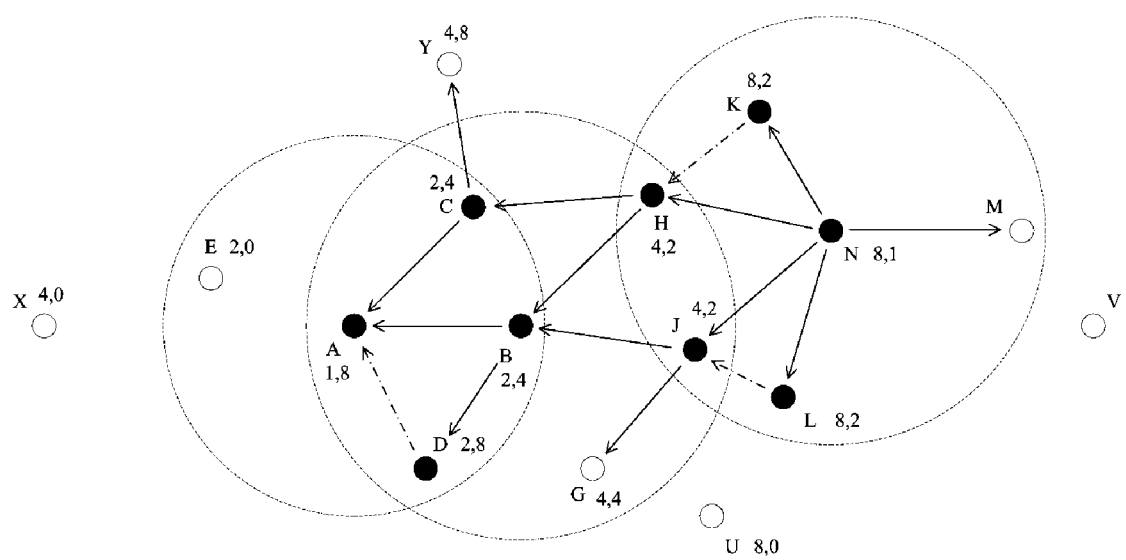
FIG. 2 is a schematic diagram of a transmission process of a backward readdressing frame and a data response frame communicating between two devices.
Figure 3:
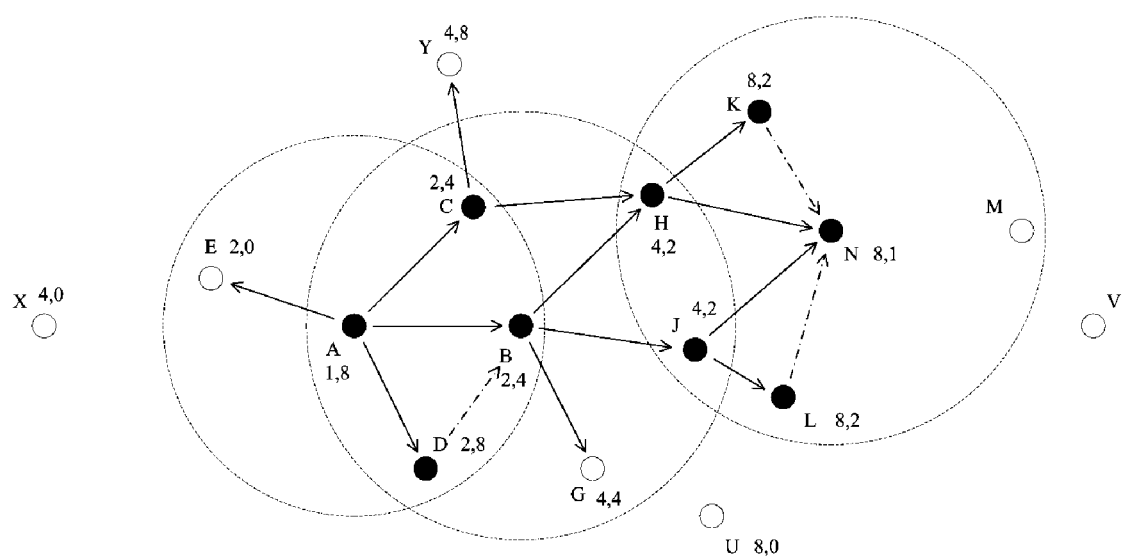
FIG. 3 is a schematic diagram of a transmission process of a data frame communicating between two devices.

One embodiment of the method of forward addressing and backward readdressing interconnect includes the transmission process of a forward addressing frame, a backward readdressing frame, a data frame and a data response frame, referring to FIG. 1, FIG. 2 and FIG. 3.

The A to Y in FIG. 1, FIG. 2 and FIG. 3 are peer devices distributed in a certain region, and the dotted circle with A as a circle center represents the effective signal range of the device A, similarly, the effective signal ranges of the device B and the device N are also represented. Wherein any device has a similar range like this, and the devices in the circle are representative of its neighbors. As can be seen from FIG. 1, the neighbors of the device A are B, C, D and E, and the neighbors of the device B are A, C, D, G, H and J, and the neighbors of the device N are H, J, K, L and M.

An embodiment is that a transaction initiator A initiates a data transaction to a destination device N.

FIG. 1 shows a transmission process of a forward addressing frame, firstly device A sends a forward addressing frame when the medium is idle, the device A sets each field, and FT is set to represent a forward addressing frame and indicate the lengths of DA, SA, TA are 48 bits or 64 bits respectively, and DA is the MAC address of the device N, SA is the MAC address of the device A, TA=SA, and TID is a random number, FA=1, FWn=0, and setting FWmax=100.

When the device A sends a forward addressing frame, a set of data of DA_L、SA_L、TID_L、FA_L、BA_L、TXn_L、RXn_L、BR_flag_L is recorded in the local storage, the front four respectively correspond to DA, SA, TID and FA in the forward addressing frame, wherein DA_L、SA_L are 64-bit length and are 64-bit extension of DA and SA respectively, if DA is 64 bits, then DA_L=DA, and if DA is 48 bits, and then the DA_L is that supplementing 16 0 in front of the DA, and the relation between the SA_L and the SA is the same, in addition, BA_L、TXn_L、RXn_L are all 16-bit length, setting BA_L=TXn_L=RXn_L=0, and BR_flag_L is 1 bit length, and setting BR_flag_L=0.

For the device A, FA_L=1, BA_L=0, marked as "1, 0", as shown in FIG. 1.

The forward addressing frame sent by the device A can be received by its neighbors, and device A determines that the neighbor receives the frame by receiving the frame forwarded by the neighbor, and if necessary, re-sending is taken to ensure that all its neighbors receive the forward addressing frame. The devices B, C, D and E serving as neighbors are all receive the frame, firstly they inquire whether a corresponding record that matches with three data of DA, SA, TID in the forward addressing frame exists in the local storage, and obviously not, then comparing the DA with its own MAC address, and obviously unequal, and continuing to compare FWn with FWmax, because FWn=0, FWmax=100, then FWn<FWmax is valid, then after 1 is added to FWn, rewriting FWn to FWn field of the forward addressing frame, and at the moment, FWn=1, FA is circularly left shift by 1 bit according to the addressing strategy, and then FA=2, and TA field is rewritten by their own MAC addresses, and FT field correspondingly modifies the length indication of TA, then the forward addressing frame is forwarded out, meanwhile a set of data of a 64-bit extension of DA, a 64-bit extension of SA, TID and updated FA, 0, 0, 0, 0, corresponding to DA_L、SA_L、TID_L、FA_L、BA_L、TXn_L、RXn_L、BR_flag_L is recorded in the local storage. For these devices, FA_L=2, BA_L=0, and marked as "2, 0", as shown in FIG. 1.

The forward addressing frame sent by the device B can be received by its neighbors, and device B determines that the neighbor receives the frame through receiving the frame forwarded by the neighbor or a response frame, and if necessary, re-sending is taken to ensure that all its neighbors receive the forward addressing frame. The devices A, C, D, G, H and J serving as neighbors are all receive the frame, firstly they inquire whether a corresponding record that matches with three data of DA, SA, TID in the forward addressing frame exists in the local storage, obviously for devices A, C and D, it is valid, then device A, C and D abandon the frame and send an ACK frame as a response, and for the devices G, H and J, it is invalid, and then the device G, H and J compares DA with its own MAC addresses, obviously not equal, continuing to compared FWn with FWmax, because FWn=1, FWmax=100, FWn<FWmax is valid, the 1 is added to FWn and rewriting FWn to FWn field of the forward addressing frame, and at the time FWn=2, and the TA field is rewritten by their own MAC addresses, and the FT field correspondingly modifies the length indication of the TA, and the FA is circularly left shifted by 1 bit according to the addressing strategy, then FA=4, and then the forward addressing frame is forwarded, and meanwhile, a set of data of a 64-bit extension of DA, a 64-bit extension of SA, TID and updated FA, 0, 0, 0, 0, corresponding to DA_L、SA_L、TID_L、FA_L、BA_L、TXn_L、RXn_L、BR_flag_L is recorded in the local storage. For these devices, FA_L=4, BA_L=0, and marked as "4, 0", as shown in FIG. 1, similar to device B, the forward addressing frame is forwarded by devices C, D, and E, which makes devices X and Y have the same "FA_L, BA_L", numerical value is "4, 0", as shown in FIG. 1.

Device H will receive the forward addressing frame forwarded by devices B and C, and first receiving will be recorded locally, until the next receiving, because the local record is matched with and correspond to three data of DA, SA and TID in the frame, the frame is abandoned, which could not affect the local recording. The device G is similar to the situation of device H.

If the transaction initiator A and the destination device N are far away from each other, a lot of relay devices are required to be connected in the middle, according to the embodiment, the description is simplified herein according to the same principle.

At the next level, the forward addressing frame is forwarded to the devices K, L, N and U, so that they have the same "FA_L, BA_L", numerical value is "8, 0", as shown in FIG. 1. Device N determines that it is the destination device itself because the comparison DA and its own MAC address result are equal, and then preparing itself as an initiating device for sending the backward readdressing frame, and meanwhile, a set of data of a 64-bit extension of DA, a 64-bit extension of SA, TID and FA, 0, 0, 0, 0 corresponding to DA_L、SA_L、TID_L、FA_L、BA_L、TXn_L、RXn_L、BR_flag_L is recorded in the local storage. The other devices still forward the forward addressing frame, until the level of FWn=FWmax is met, or no more devices exist in the system for forwarding.

FIG. 2 shows a transmission process of a backward readdressing frame, firstly the initiator device N sends a backward readdressing frame when the medium is idle, FT is set to represent a backward readdressing frame and indicate the lengths of DA, SA and TA are 48 bits or 64 bits respectively, the DA, SA and TID are corresponding values in the forward addressing frame, the TA is the MAC address of the device N, TA=DA, the FA is FA_L value correspondingly recorded in the local storage, FA=8, BA is set according to the addressing starting point, and BA=1.

When the device N sends a backward readdressing frame, update BA_L=1 in a set of data of DA_L、SA_L、TID_L、FA_L、BA_L、TXn_L、RXn_L、BR_flag_L in the local storage, the set of data is matching when using three data of DA, SA, TID as an index, and BR_flag_L=1. For device N, FA_L=8, BA_L=1, marked as "8,1", as shown in FIG. 2.

The backward readdressing frame sent by the device N can be received by its neighbors, and device N determines that the neighbor receives the frame through receiving the frame forwarded by the neighbor or a response frame, and if necessary, re-sending is taken to ensure that all its neighbors receive the backward readdressing frame. The devices H and J serving as neighbors see the frame as a response frame from device N, so as to know that a forward addressing frame does not need to be resent. Devices H, J, K, L and M all receive the backward readdressing frame, firstly they inquire whether a corresponding record that matches with three data of DA, SA, TID in the backward readdressing frame exists in the local storage, the device M abandons the frame due to no such record and sends an ACK frame as a response, and devices H, J, K and L have such record, then they continue to compare whether corresponding locally stored BR_flag_L is 1, because of BR_flag_L=0, then comparing SA with their own MAC addresses, obviously not equal, continuing to compare the locally stored corresponding FA_L with the FA in the backward readdressing frame, and device H and the J satisfy that the FA_L circularly left shifted 1 bit equals to the FA, and then FA_L is written to the FA field of the backward readdressing frame, and the BA is rewritten to the BA field of the backward readdressing frame after the BA is circularly left shifted by 1 bit, the TA field is rewritten by their own MAC addresses, and the FT field correspondingly modifies the length indication of the TA, then the backward readdressing frame is forwarded, and meanwhile, update BA_L in a set of data of DA_L、SA_L、TID_L、FA_L、BA_L、TXn_L、RXn_L、BR_flag_L in the local storage to be updated BA, the set of data is matching when using three data of DA, SA, TID as an index, and setting BR_flag_L=1. For devices H and J, FA_L=4, BA_L=2, marked as "4,2", as shown in FIG. 2. In addition, the devices K and L are adjacent to the destination device N and have the same FA, so that the backward readdressing frame is forwarded, and before forwarding, BA is circularly left shifted by 1 bit and is recorded in the local storage, and setting BR_flag_L=1 after forwarding, wherein for the devices K and L, FA_L=8, BA_L=2, marked as "8, 2", as shown in FIG. 2. If the destination device N moves away from the devices H and J and exceeds the effective communication range before sending the backward readdressing frame, and then forwarding through the device K or L, the device H or J can still receive the backward readdressing frame, and at the moment, the BA_L of the device H or J will be addressed to be a numerical value of 4 which is one level lower than that of the device K or L.

The device B receives the backward readdressing frame forwarded by the devices H and J, and first receiving will be recorded locally, and the value of the locally stored "FA_L, BA_L" is marked as "2, 4", and setting BR_flag_L=1, until the next receiving, because BR_flag_L=1 is satisfied, the frame is abandoned, which will not affect the local recording. The device C receives a backward readdressing frame forwarded from the H, due to the fact that the condition is met, the value of locally stored "FA_L, BA_L" is marked as "2, 4", as shown in FIG. 2. The device G will receive the backward readdressing frame forwarded from the J, but the condition that FA_L is left shifted by 1 bit equal to FA is not met, so that the frame is abandoned and an ACK frame is sent as a response, and the corresponding BA_L is still set to be 4 according to the addressing strategy, the value of "FA_L, BA_L" stored locally is marked as "4, 4", as shown in FIG. 2. The devices B and C receive the backward readdressing frames forwarded by the opposite side, and abandoning due to the fact that the conditions are not met.

The next lower level, the backward readdressing frame is forwarded by the device B to the devices A and D, and is forwarded by the device C to device A and the device Y, with the same principle the device Y does not meet the condition, and the frame is abandoned, and the value thereof "FA_L, BA_L" as shown in FIG. 2 is as "4, 8", the device A as the destination device receives the frame and only once, the value of "FA_L, BA_L" is as "1, 8", as shown in FIG. 2. The BR_flag_L of the device A is set to be 1. In addition, as the device B and the device D serve as the next lower level device of FA of the transaction initiator A, so that the device D receives and forwards the backward readdressing frame from the device B and the value of "FA_L, BA_L" of the device D is "2, 8", as shown in FIG. 2. If the transaction initiator A moves away from the devices B and C and exceeds the effective communication range before receiving the backward readdressing frame, and then forwarding through the device D, the transaction initiator A can still receive the backward readdressing frame, and at the moment, the BA_L of the device A will be addressed to be a numerical value of 16 which is one level lower than that of the device D.

As can be seen from FIG. 2, between a transaction initiator A and a destination device N, the selected intermediate devices B, C, H and J and D, K, L become relay devices forming the interconnection channels, the possible interconnection channels are A-B-J-N, A-B-H-N, A-C-H-N or may be longer when D, K and L are involved, specifically which one will be used is completely decided by the state of device at the time of communication. Because each device is preempting communication rights, the interconnection channels that can be got through must not be interfered by other signals. Therefore, it can be seen that the method for establishing the interconnection channel has randomness and redundancy.

Next, the transaction initiator A sends out a data frame, and the sending process is as shown in FIG. 3. Firstly, the device A sends a data frame when the medium is idle, wherein FT is set to represent a data frame and indicate the lengths of DA, SA and TA are 48 bits or 64 bits respectively, DA, SA and TID are consistent with that of the corresponding forward addressing frame, and TA=SA, BA=8, setting TXn=1 to represent the first data frame, and the VLM being a sending datagram. Corresponding TXn_L=1, RXn_L=0 in the local storage are set.

As shown in FIG. 3, a data frame sent by the device A can be received by its neighbors, and device A confirms that the neighbor receives the frame through receiving the frame forwarded by the neighbor or a response frame, and if necessary, resending is taken to ensure that all its neighbors receive the frame. The devices B, C, D and E serving as neighbors all receive the frame, firstly they inquire whether a corresponding record that matches with three data of DA, SA, TID in the data frame exists in the local storage, obviously yes, then comparing TXn_L=TXn−1 which is also satisfied, and then comparing the DA with respective MAC addresses, and obviously not equal, and continuously comparing BA with BA_L, as BA=8, only the device B and the device C meet the fact that the circularly left shift 1 bit of the BA_L is equal to BA. Then, the devices B and C rewrite the BA field of the data frame to be 4, and setting TXn_L=TXn, and then TXn_L=1, and the TA field is rewritten by their own MAC addresses, the FT field correspondingly modifies the length indication of the TA, and then the data frame is forwarded. Through a similar process, the devices G and Y abandon due to the fact that the circularly left shift 1 bit of the BA_L is not equal to BA, the devices H and J satisfy the condition so as to continuously forward the data frame, and finally, the destination device N receives the datagram VLM. During the period of time, device H receives forwarded data frames from the devices B and C in sequence, the corresponding TXn_L=TXn in the local storage is set after receiving from one of them, as a result that TXn_L=TXn−1 is not met when the next forwarded data frame is received, so that the same data frame is only received once. The destination device N receives the forwarded data frames from H and J in sequence, similarly accepting only once. In addition, since the device D and the transaction initiator A have the same BA and are adjacent, so that the device D forwards the data frame from the device A and the data frame can be received by the device B. If the transaction initiator A moves away from the devices B and C and exceeds the effective communication range, the transmission of the data frame can be guaranteed through the forwarding of the device D. Similarly, since the devices K, L and the devices H, J are all located at the next lower level of the destination device BA, so that the device H or J forwards the data frame to the device K or L. If the destination device N moves away from the devices H and J and exceeds the effective communication range, it is still possible for device N to receive the data frame via the forwarding of the device K or L.

The process of sending a data response frame by the destination device N is shown in FIG. 2, and whether the FA_L which is circularly left shifted by 1 bit is equal to FA is mainly used as a criterion, the process is similar to the transmission of the data frames, and therefore the description is not repeated. The data response frame is finally received by the transaction initiator A via the devices H, J and the devices B and C. In addition, the devices K, L and the destination device N have the same FA and the devices K, L are adjacent to the destination device N, so that the data response frame is forwarded, and the device D and the device B are at the next lower level of FA of the transaction initiator A, so that the device D forwards the data response frame from the device B.

The transaction initiator A can continuously send out a plurality of data frames, and the destination device N correspondingly responds with the data response frames.

Figure 4:
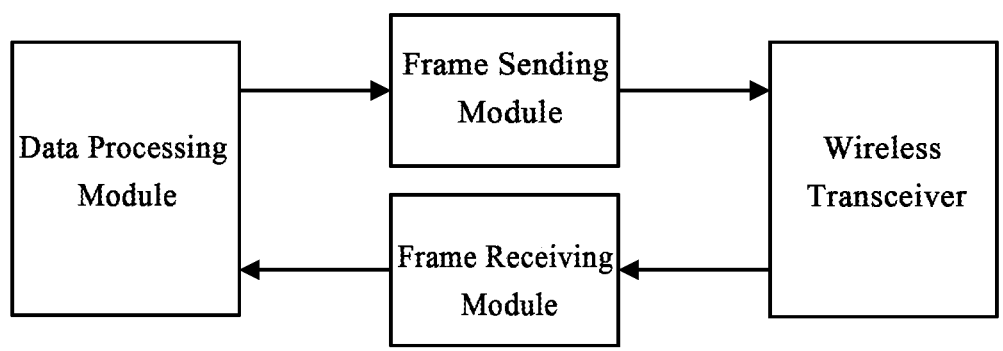
FIG. 4 is a structural block diagram of a device.

As another aspect of the disclosure, the structural composition of a device of forward addressing and backward readdressing interconnect according to an embodiment is as shown in FIG. 4, the device includes a data processing module, a frame sending module, a frame receiving module and a wireless transceiver.

The data processing module processes the data, and transmits the data needing to be sent to the frame sending module after grouping the data into frames by category; and receives various categories of frames from the frame receiving module, and analyzes out data, or transmits a frame correspondingly generated for response to the frame sending module, or transmits a frame correspondingly generated for forwarding to the frame sending module. The frame sending module receives various categories of frames from the data processing module and adds the frames into a sending queue, and sends frames in sequence through the wireless transceiver. The frame receiving module receives various categories of frames from the wireless transceiver and adds the frames into a receiving queue, and transmits frames in sequence to the data processing module for analysis. The wireless transceiver sends out various categories of frames from the frame sending module through an antenna by means of an electromagnetic wave signal, and performs CRC-32 checking on the whole frame of data before sending, and attaches the checking result to the frame tail, or receives the electromagnetic wave signal from the antenna and analyzes out every categories of frames and then performs CRC-32 checking, and transmits valid frames to the frame receiving module and abandons the invalid frames.

When the transaction initiator and the destination device communicate with each other by means of a wireless signal using an electromagnetic wave as a medium, including an addressing stage and a data stage, the data processing module is operated according to the embodiments of the method of forward addressing and backward readdressing interconnect, and repeated description is omitted herein.

Those skilled in the art are easy to understand that the foregoing descriptions are only preferred embodiments of the disclosure, and are not intended to limit the disclosure, any modification, equivalent replacement and improvement and the like which are made within the spirit and principle of the disclosure are all included in the protection scope of the disclosure.

Figure 5:
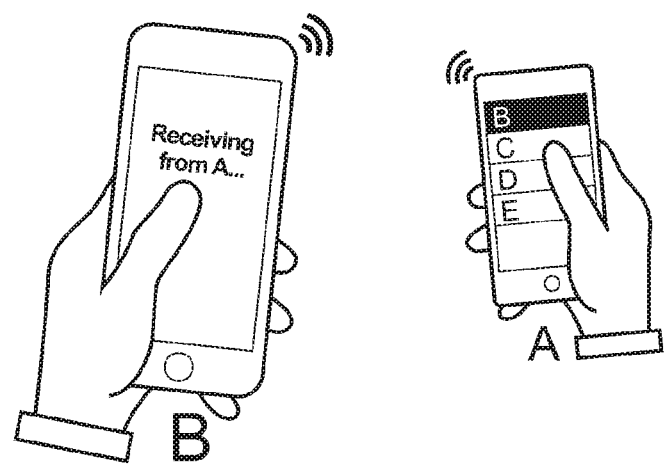
FIG. 5 is a schematic diagram of the disclosure applying to transmit file between handheld devices.

FIG. 5 is a schematic diagram of the disclosure applying to transmit file between handheld devices, wherein the handheld device A and the handheld device B are mutually adjacent, so that the MAC addresses of the device B and other devices such as device C, D and E can be known in the device A, so that the device A can send the file to the device B through simple operations. When the distance between the device A and the device B is far away and even out of the effective communication range, due to the fact that the MAC addresses of the opposite sides are known to each other, data can still be exchanged through relay of the intermediate devices.

Figure 6:
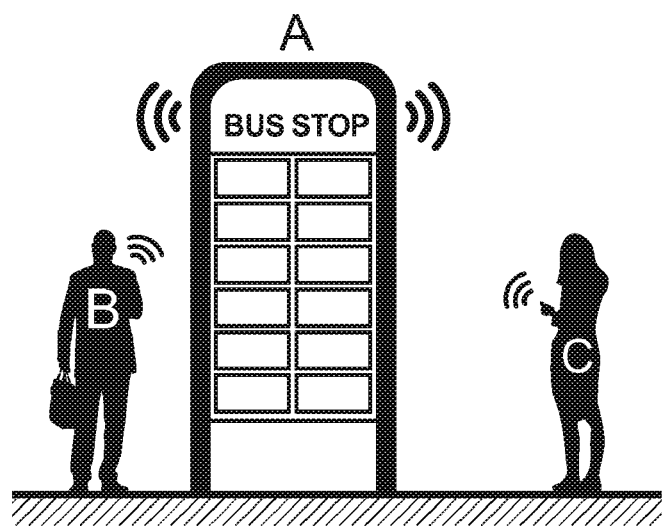
FIG. 6 is a schematic diagram of the disclosure applying to transmit station board information from a bus station to a plurality of handheld devices.

FIG. 6 is a schematic diagram of the disclosure applying to transmit station board information from a bus station to a plurality of handheld devices, a station board device A of the bus station makes a mass sending of a message such as a vehicle route to neighbors, the handheld device B and the handheld device C all receive the message, the device B or C can further interact with the station board device A to obtain more information. The device B or C records the MAC address of the station board device A, even when being far away from the station board device A, the information of the station board device A can be acquired at any time through intermediate devices relaying.

Figure 7:
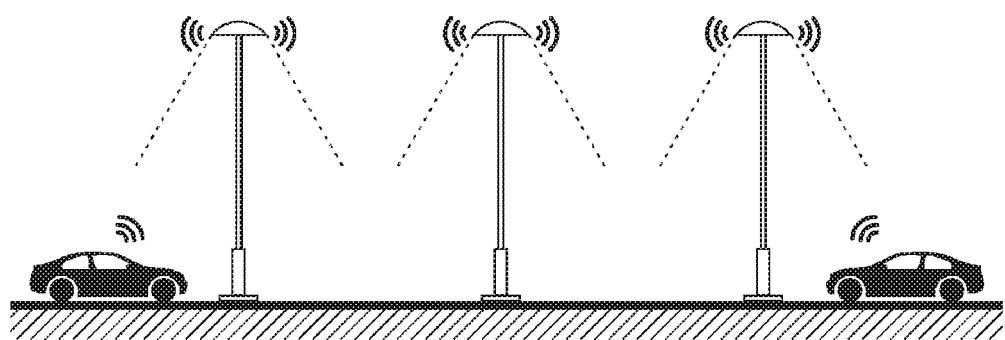
FIG. 7 is a schematic diagram of the disclosure applying to transfer communication between vehicles through street lamps.

FIG. 7 is a schematic diagram of the disclosure applying to transfer communication between vehicles through street lamps relaying, the street lamp device is wide in coverage and fixed in position, and may form a foundation of a communication forwarding node, the automobile devices or the handheld device on automobiles can forward data through the street lamp as the intermediate device, so that communication between the automobiles can be realized, due to the fact that the position of the automobile is continuously changed, a short data frame should be used to perform transaction, and each transaction needs to be re-subjected to an addressing stage to establish a new interconnection channel. The road network is criss-cross, the coverage area is large, and the street lamp serves as a foundation of the communication forwarding node, which can be connected to all devices of the whole city and even of a plurality of cities.

The content which is not described in detail in this specification belongs to the prior art known to those skilled in the art.

What is claimed is:

1. A method of forward addressing and backward readdressing interconnect, which is based on each device having a globally unique identity identification number called MAC address, wherein a transaction initiator and a destination device are communicated through a wireless signal using the electromagnetic wave as a medium, including an addressing stage and a data stage, wherein said addressing stage comprises the following steps:
- S1, said transaction initiator sending a forward addressing frame with a MAC address of said destination device, wherein said MAC address of said destination device is referred to as DA, a MAC address of said transaction initiator, wherein said MAC address of said transaction initiator is referred to as SA, and a transaction event identification, wherein said transaction event identification is referred to as TID; intermediate devices receiving and forwarding said forward addressing frame; said forward addressing frame further containing a forward address, wherein said forward address is referred to as FA, setting FA every time when said forward addressing frame passing through one of said intermediate devices, said transaction initiator, and said destination device by taking said transaction initiator as an addressing starting point according to an addressing strategy, one of said intermediate devices, said transaction initiator, and said destination device which is passed through by said forward addressing frame recording values corresponding to DA, SA, TID and FA in a local storage; and any device only accepting said forward addressing frame with the same DA, SA, TID once;
- S2, after said destination device receiving said forward addressing frame, sending a backward readdressing frame with the same DA, SA, TID and a corresponding locally stored FA obtained in response to a reception of said forward addressing frame; an intermediate device, whose corresponding locally stored DA, SA, TID are matching and corresponding FA comparing with that of in said backward readdressing frame is as that of in a next upper level, forwarding said backward readdressing frame, before forwarding, a FA in the frame is replaced by a locally stored FA; said transaction initiator receiving said backward readdressing frame; said backward readdressing frame further containing a backward address, wherein said backward address is referred to as BA, setting BA every time when said backward readdressing frame passing through one of said intermediate devices, said transaction initiator, and said destination device by taking said destination device as an addressing starting point according to said addressing strategy, one of said intermediate devices, said transaction initiator, and said destination device which is passed through by said backward readdressing frame correspondingly recording a value of BA in a local storage; and any device only accepting said backward readdressing frame with the same DA, SA and TID once.

2. The method of forward addressing and backward readdressing interconnect according to claim 1, wherein said transaction event identification TID is a random number of 48-bit length generated by said transaction initiator before sending said forward addressing frame; said forward addressing frame and said backward readdressing frame further containing a MAC address of a transmitting device TA; and
- the step S2 further comprises: an intermediate device, which is adjacent to said destination device and has a same FA as said destination device and whose corresponding locally stored DA, SA and TID are matching, forwarding said backward readdressing frame; an intermediate device, which is at a next lower level of said transaction initiator FA and whose corresponding locally stored DA, SA and TID are matching, forwarding said backward readdressing frame to an intermediate device, which is also at a next lower level of said transaction initiator FA and has a same level FA thereof.

3. The method of forward addressing and backward readdressing interconnect according to claim 2, wherein said data stage comprises the following steps:
- S3, after said transaction initiator receiving said backward readdressing frame, sending a data frame with corresponding the same DA, SA, TID as said forward addressing frame and a corresponding BA stored locally; said data frame further containing a data frame sequence number TXn, a device that is passed through by said data frame recording a value of the TXn in a local storage; an intermediate device, whose locally stored BA comparing with that of in the frame is as that of in the next upper level and locally stored DA, SA, TID are matching and corresponding TXn is just smaller than that of in the frame by 1, receiving and forwarding said data frame, before forwarding, a BA in the frame is replaced by a locally stored BA; said destination device receiving said data frame; and any device only accepting said data frame with the same DA, SA, TID and TXn once;
- S4, after said destination device receiving said data frame, sending a data response frame with the same DA, SA, TID and a corresponding locally stored FA; said data response frame further containing a data response frame sequence number RXn, and the RXn is consistent with a TXn of the corresponding said data frame, a device that is passed through by said data response frame correspondingly recording a value of the RXn in a local storage; an intermediate device, whose locally stored FA comparing with that of in the frame is as that of in the next upper level and locally stored DA, SA, TID are matching and corresponding RXn is just smaller than that of in the frame by 1, receiving and forwarding said data response frame, before forwarding, a FA in the frame is replaced by a locally stored FA; said transaction initiator receiving said data response frame; and any device only accepting said data response frames with the same DA, SA, TID and RXn once;
- S5, under the same said transaction event identification TID, the operations mentioned in the steps S3 and S4 can be continuously performed for multiple times, and 1 is added to the TXn every time before S3 is performed.

4. The method of forward addressing and backward readdressing interconnect according to claim 3, wherein the length of said data frame sequence number TXn and the length of said data response frame sequence number RXn are 16 bits, $0 \leq TXn < 2^{16}-1$, $0 \leq RXn < 2^{16}-1$, and said transaction initiator setting TXn from 1 for sending said data frame; said data frame and said data response frame further containing a MAC address of a transmitting device TA; said data frame and said data response frame can select whether a datagram is carried, a length of the datagram is variable of 0-64 kilobit; further
- said step S3 further comprises: an intermediate device, which is adjacent to said transaction initiator and has a same BA as said transaction initiator and whose locally stored DA, SA, TID are matching and corresponding TXn is just smaller than that of in the frame by 1, forwarding said data frame; an intermediate device, which is at a next lower level of said destination device BA and whose locally stored DA, SA, TID are matching and corresponding TXn is just smaller than that of in the frame by 1, forwarding said data frame to an intermediate device with a same level BA thereof; and said step S4 further comprises: an intermediate device, which is adjacent to said destination device and has a same FA as said destination device and whose corresponding locally stored DA, SA, TID are matching and corresponding RXn is just smaller than that of in the frame by 1, forwarding said data response frame; an intermediate device, which is at a next lower level of said transaction initiator FA and whose corresponding locally stored DA, SA, TID are matching and corresponding RXn is just smaller than that of in the frame by 1, forwarding said data response frame to an intermediate device with a same level FA thereof.

5. The method of forward addressing and backward readdressing interconnect according to claim 1, wherein said addressing strategy is that: a length of an address is 16 bits, an address of a device of an addressing starting point is 1, and the address is circularly left shifted by one bit each time after passing through a device.

6. The method of forward addressing and backward readdressing interconnect according to claim 5, wherein said data stage comprises the following steps:
S3, after said transaction initiator receiving said backward readdressing frame, sending a data frame with corresponding the same DA, SA, TID as said forward addressing frame and a corresponding BA stored locally; said data frame further containing a data frame sequence number TXn, a device that is passed through by said data frame recording a value of the TXn in a local storage; an intermediate device, whose locally stored BA comparing with that of in the frame is as that of in the next upper level and locally stored DA, SA, TID are matching and corresponding TXn is just smaller than that of in the frame by 1, receiving and forwarding said data frame, before forwarding, a BA in the frame is replaced by a locally stored BA; said destination device receiving said data frame; and any device only accepting said data frame with the same DA, SA, TID and TXn once;
S4, after said destination device receiving said data frame, sending a data response frame with the same DA, SA, TID and a corresponding locally stored FA; said data response frame further containing a data response frame sequence number RXn, and the RXn is consistent with a TXn of the corresponding said data frame, a device that is passed through by said data response frame correspondingly recording a value of the RXn in a local storage; an intermediate device, whose locally stored FA comparing with that of in the frame is as that of in the next upper level and corresponding locally stored DA, SA, TID are matching and a corresponding RXn is just smaller than that of in the frame by 1, receiving and forwarding said data response frame, before forwarding, a FA in the frame is replaced by a locally stored FA; said transaction initiator receiving said data response frame; and any device only accepting said data response frame with the same DA, SA, TID and RXn once;
S5, under the same said transaction event identification TID, the operations mentioned in the steps S3 and S4 can be continuously performed for multiple times, and 1 is added to the TXn every time before S3 is performed.

7. The method of forward addressing and backward readdressing interconnect according to claim 6, wherein the length of said data frame sequence number TXn and the length of said data response frame sequence number RXn are 16 bits, $0 \leq TXn < 2^{16}-1$, $0 \leq RXn < 2^{16}-1$, and said transaction initiator setting TXn from 1 for sending said data frame; said data frame and said data response frame further containing a MAC address of a transmitting device TA; said data frame and said data response frame can select whether a datagram is carried, a length of the datagram is variable of 0-64 kilobit; further
said step S3 further comprises: an intermediate device, which is adjacent to said transaction initiator and has a same BA as said transaction initiator and whose locally stored DA, SA, TID are matching and corresponding TXn is just smaller than that of in the frame by 1, forwarding said data frame; an intermediate device, which is at a next lower level of said destination device BA and whose locally stored DA, SA, TID are matching and corresponding TXn is just smaller than that of in the frame by 1, forwarding said data frame to an intermediate device with a same level BA thereof; and
said step S4 further comprises: an intermediate device, which is adjacent to said destination device and has a same FA as said destination device and whose corresponding locally stored DA, SA, TID are matching and corresponding RXn is just smaller than that of in the frame by 1, forwarding said data response frame; an intermediate device, which is at a next lower level of said transaction initiator FA and whose corresponding locally stored DA, SA, TID are matching and corresponding RXn is just smaller than that of in the frame by 1, forwarding said data response frame to an intermediate device with a same level FA thereof.

8. The method of forward addressing and backward readdressing interconnect according to claim 1, wherein said data stage comprises the following steps:
S3, after said transaction initiator receiving said backward readdressing frame, sending a data frame with corresponding the same DA, SA, TID as said forward addressing frame and a corresponding BA stored locally; said data frame further containing a data frame sequence number TXn, a device that is passed through by said data frame recording a value of the TXn in a local storage; an intermediate device, whose locally stored BA comparing with that of in the frame is as that of in the next upper level and locally stored DA, SA, TID are matching and a corresponding TXn is just smaller than that of in the frame by 1, receiving and forwarding said data frame, before forwarding, a BA in the frame is replaced by a locally stored BA; said destination device receiving said data frame; and any device only accepting said data frame with the same DA, SA, TID and TXn once;
S4, after said destination device receiving said data frame, sending a data response frame with the same DA, SA, TID and a corresponding locally stored FA; said data response frame further containing a data response frame sequence number RXn, and the RXn is consistent with a TXn of the corresponding said data frame, a device that is passed through by said data response frame correspondingly recording a value of the RXn in a local storage; an intermediate device, whose locally stored FA comparing with that of in the frame is as that of in the next upper level and corresponding locally stored DA, SA, TID are matching and corresponding RXn is just smaller than that of in the frame by 1, receiving and forwarding said data response frame, before forwarding, a FA in the frame is replaced by a locally stored FA; said transaction initiator receiving said data response frame; and any device only accepting said data response frame with the same DA, SA, TID and RXn once;

S5, under the same said transaction event identification TID, the operations mentioned in the steps S3 and S4 can be continuously performed for multiple times, and 1 is added to the TXn every time before S3 is performed.

9. The method of forward addressing and backward readdressing interconnect according to claim 8, wherein a length of said data frame sequence number TXn and a length of said data response frame sequence number RXn are 16 bits, $0 \leq TXn < 2^{16}-1$, $0 \leq RXn < 2^{16}-1$, and said transaction initiator setting TXn from 1 for sending said data frame; said data frame and said data response frame further containing a MAC address of a transmitting device TA; said data frame and said data response frame can select whether a datagram is carried, a length of the datagram is variable of 0-64 kilobit; further said step S3 further comprises: an intermediate device, which is adjacent to said transaction initiator and has a same BA as said transaction initiator and whose locally stored DA, SA, TID are matching and corresponding TXn is just smaller than that of in the frame by 1, forwarding said data frame; an intermediate device, which is at a next lower level of said destination device BA and whose locally stored DA, SA, TID are matching and corresponding TXn is just smaller than that of in the frame by 1, forwarding said data frame to an intermediate device with a same level BA thereof; and said step S4 further comprises: an intermediate device, which is adjacent to said destination device and has a same FA as said destination device and whose corresponding locally stored DA, SA, TID are matching and corresponding RXn is just smaller than that of in the frame by 1, forwarding said data response frame; an intermediate device, which is at a next lower level of said transaction initiator FA and whose corresponding locally stored DA, SA, TID are matching and corresponding RXn is just smaller than that of in the frame by 1, forwarding said data response frame to an intermediate device with a same level FA thereof.

10. A device of forward addressing and backward readdressing interconnect, wherein the device comprises a data processing hardware, a frame transceiver and a wireless transceiver, wherein said data processing hardware, configured to process data, and transmit the data needing to be sent to said frame transceiver after grouping the data into frames by category; receive various categories of frames from said frame transceiver, and analyze out data, or transmit a frame correspondingly generated for response to said frame transceiver, or transmit a frame correspondingly generated for forwarding to said frame transceiver;

said frame transceiver, configured to receive various categories of frames from said data processing hardware and add the frames into a sending queue, and send frames in sequence through said wireless transceiver;

said frame transceiver, also configured to receive various categories of frames from said wireless transceiver and add the frames into a receiving queue, and transmit frames in sequence to said data processing hardware for analysis;

said wireless transceiver, configured to send out various categories of frames from said frame transceiver through an antenna by means of an electromagnetic wave signal; receive an electromagnetic wave signal from the antenna and analyze out various categories of frames for transmitting to said frame transceiver;

when a transaction initiator and a destination device communicate with each other by means of a wireless signal using the electromagnetic wave as a medium, comprising an addressing stage and a data stage; in said addressing stage, said data processing hardware comprises:

when said device serves as said transaction initiator, a forward addressing frame with a MAC address of said destination device, wherein said MAC address of said destination device is referred to as DA, a MAC address of said transaction initiator, wherein said MAC address of said transaction initiator is referred to as SA and a transaction event identification, wherein said transaction event identification is referred to as TID, is generated and is sent via said frame transceiver and said wireless transceiver; when said device serves as an intermediate device, said forward addressing frame is received and forwarded; said forward addressing frame further contains a forward address, wherein said forward address is referred to as FA, and the FA is set once at the time of initiating or receiving said forward addressing frame by taking the transaction initiator as an addressing starting point according to an addressing strategy, and values corresponding to DA, SA, TID and FA is recorded in a local storage; said forward addressing frame with the same DA, SA and TID is only accepted once; and when said device serves as said destination device, after receiving said forward addressing frame via said wireless transceiver and said frame transceiver, a backward readdressing frame with the same DA, SA, TID and a corresponding locally stored FA obtained in response to a reception of said forward addressing frame, is generated and is sent out via said frame transceiver and said wireless transceiver; when said device serves as an intermediate device, whose corresponding FA comparing with that of in said backward readdressing frame is as that of in the next upper level and corresponding locally stored DA, SA, TID are matching, said backward readdressing frame is forwarded, before forwarding, a FA in the frame is replaced by a locally stored FA; when said device serves as said transaction initiator, said backward readdressing frame is received; said backward readdressing frame further contains a backward address, wherein said backward address is referred to as BA, and the BA is set once at the time of initiating or receiving said backward readdressing frame by taking said destination device as an addressing starting point according to said addressing strategy, and a value of BA is correspondingly recorded in a local storage; said backward readdressing frame with the same DA, SA and TID is only accepted once.

11. The device of forward addressing and backward readdressing interconnect according to claim 10, wherein in said addressing stage, said data processing hardware further comprises: said transaction event identification TID is a random number of 48-bit length generated by said transaction initiator before sending said forward addressing frame; said forward addressing frame and said backward readdressing frame further contains a MAC address of a transmitting device TA; and when said device serves as an intermediate device, which is adjacent to said destination device and has a same FA as said destination device and whose corresponding locally stored DA, SA, TID are matching, said backward readdressing frame is forwarded; when said device serves as an intermediate device, which is at a next lower level of said transaction initiator and whose corresponding locally stored DA, SA, TID are matching, said backward readdressing frame is forwarded to an intermediate device, which is also at the next lower level of said transaction initiator and has a same level FA thereof.

12. The device of forward addressing and backward readdressing interconnect according to claim 11, wherein in said data stage, said data processing hardware comprises:

when said device serves as said transaction initiator and receives said backward readdressing frame, a data frame with corresponding the same DA, SA, TID as said forward addressing frame and a corresponding locally stored BA, is generated and is sent out via said frame transceiver and said wireless transceiver; said data frame further contains a data frame sequence number TXn, when said data frame is initiated or received, a value of the TXn is recorded in a local storage; when said device serves as an intermediate device, whose locally stored BA comparing with that of in the frame is as that of in the next upper level and locally stored DA, SA, TID are matching and corresponding TXn is just smaller than that of in the frame by 1, said data frame is received and forwarded, before forwarding, a BA in the frame is replaced by a locally stored BA; when said device serves as said destination device, said data frame is received; and said data frame with the same DA, SA, TID and TXn is only accepted once; and when said device serves as said destination device and receives said data frame, a data response frame with the same DA, SA, TID and a corresponding locally stored FA, is generated and is sent out via said frame transceiver and said wireless transceiver; said data response frame further contains a data response frame sequence number RXn, and the RXn is consistent with a TXn of the corresponding said data frame, when said data response frame is initiated or received, a value of the RXn is correspondingly recorded in a local storage; when said device serves as an intermediate device, whose locally stored FA comparing with that of in the frame is as that of in the next upper level and corresponding locally stored DA, SA, TID are matching and corresponding RXn is just smaller than that of in the frame by 1, said data response frame is received and forwarded, before forwarding, a FA in the frame is replaced by a locally stored FA; when said device serves as said transaction initiator, said data response frame is received; and said data response frame with the same DA, SA, TID and RXn is only accepted once; and under the same said transaction event identification TID, the above operations can be continuously performed for multiple times, and 1 is added to the TXn every time before performing.

13. The device of forward addressing and backward readdressing interconnect according to claim 12, wherein in said data stage, said data processing hardware further comprises: a length of said data frame sequence number TXn and a length of said data response frame sequence number RXn are 16 bits, $0 \leq TXn < 2^{16}-1$, $0 \leq RXn < 2^{16}-1$, and said transaction initiator sets TXn from 1 for sending out said data frame; said data frame and said data response frame further contain a MAC address of a transmitting device TA; said data frame and said data response frame can select whether a datagram is carried, a length of the datagram is variable of 0-64 kilobit; further when said device serves as an intermediate device, which is adjacent to said transaction initiator and has a same BA as said transaction initiator and whose locally stored DA, SA, TID are matching and corresponding TXn is just smaller than that of in the frame by 1, said data frame is forwarded; when said device serves as an intermediate device, which is at a next lower level of said destination device BA and whose locally stored DA, SA, TID are matching and corresponding TXn is just smaller than that of in the frame by 1, said data frame is forwarded to an intermediate device with a same level BA thereof; and when said device serves as an intermediate device, which is adjacent to said destination device and has a same FA as said destination device and whose corresponding locally stored DA, SA, TID are matching and corresponding RXn is just smaller than that of in the frame by 1, said data response frame is forwarded; when said device serves as an intermediate device, which is at a next lower level of said transaction initiator FA and whose corresponding locally stored DA, SA, TID are matching and corresponding RXn is just smaller than that of in the frame by 1, said data response frame is forwarded to an intermediate device with a same level FA thereof.

14. The device of forward addressing and backward readdressing interconnect according to claim 10, wherein said addressing strategy is that: a length of an address is 16 bits, an address of said device of an addressing starting point is 1, and the address is circularly left shifted by one bit each time after passing through one of said intermediate devices, said transaction initiator, and said destination device.

15. The device of forward addressing and backward readdressing interconnect according to claim 14, wherein in said data stage, said data processing hardware comprises:

when said device serves as said transaction initiator and receives said backward readdressing frame, a data frame with corresponding the same DA, SA, TID as said forward addressing frame and a corresponding locally stored BA, is generated and is sent out via said frame transceiver and said wireless transceiver; said data frame further contains a data frame sequence number TXn, when said data frame is initiated or received, a value of the TXn is recorded in a local storage; when said device serves as an intermediate device, whose locally stored BA comparing with that of in the frame is as that of in the next upper level and locally stored DA, SA, TID are matching and corresponding TXn is just smaller than that of in the frame by 1, said data frame is received and forwarded, before forwarding, a BA in the frame is replaced by a locally stored BA; when said device serves as said destination device, said data frame is received; and said data frame with the same DA, SA, TID and TXn is only accepted once; and when said device serves as said destination device and receives said data frame, a data response frame with the same DA, SA, TID and a corresponding locally stored FA, is generated and is sent out via said frame transceiver and said wireless transceiver; said data response frame further contains a data response frame sequence number RXn, and the RXn is consistent with a TXn of the corresponding said data frame, when said data response frame is initiated or received, a value of the RXn is correspondingly recorded in a local storage; when said device serves as an intermediate device, whose locally stored FA comparing with that of in the frame is as that of in the next upper level and corresponding locally stored DA, SA, TID are matching and corresponding RXn is just smaller than that of in the frame by 1, said data response frame is received and forwarded, before forwarding, a FA in the frame is replaced by a locally stored FA; when a device serves as said transaction initiator, said data response frame is received; and said data response frame with the same DA, SA, TID and RXn is only accepted once; and under the same said transaction event identification TID, the above operations can be continuously performed for multiple times, and 1 is added to the TXn every time before performing.

16. The device of forward addressing and backward readdressing interconnect according to claim 15, wherein in said data stage, said data processing hardware further comprises: a length of said data frame sequence number TXn and a length of said data response frame sequence number RXn are 16 bits, $0 \leq TXn < 2^{16}-1$, $0 \leq RXn < 2^{16}-1$, and said transaction initiator sets TXn from 1 for sending out said data frame; said data frame and said data response frame further contain a MAC address of a transmitting device TA; said data frame and said data response frame can select whether a datagram is carried, a length of the datagram is variable of 0-64 kilobit; further when a device serves as an intermediate device, which is adjacent to said transaction initiator and has a same BA as said transaction initiator and whose locally stored DA, SA, TID are matching and corresponding TXn is just smaller than that of in the frame by 1, said data frame is forwarded; when a device serves as an intermediate device, which is at a next lower level of said destination device BA and whose locally stored DA, SA, TID are matching and corresponding TXn is just smaller than that of in the frame by 1, said data frame is forwarded to an intermediate device with a same level BA thereof; and when a device serves as an intermediate device, which is adjacent to said destination device and has a same FA as said destination device and whose corresponding locally stored DA, SA, TID are matching and corresponding RXn is just smaller than that of in the frame by 1, said data response frame is forwarded; when a device serves as an intermediate device, which is at a next lower level of said transaction initiator FA and whose corresponding locally stored DA, SA, TID are matching and corresponding RXn is just smaller than that of in the frame by 1, said data response frame is forwarded to an intermediate device with a same level FA thereof.

17. The device of forward addressing and backward readdressing interconnect according to claim 10, wherein in said data stage, said data processing hardware comprises:

when said device serves as said transaction initiator and receives said backward readdressing frame, a data frame with corresponding the same DA, SA, TID as said forward addressing frame and a corresponding locally stored BA, is generated and is sent out via said frame transceiver and said wireless transceiver; said data frame further contains a data frame sequence number TXn, when said data frame is initiated or received, a value of the TXn is recorded in a local storage; when said device serves as an intermediate device, whose locally stored BA comparing with that of in the frame is as that of in the next upper level and locally stored DA, SA, TID are matching and corresponding TXn is just smaller than that of in the frame by 1, said data frame is received and forwarded, before forwarding, a BA in the frame is replaced by a locally stored BA; when said device serves as said destination device, said data frame is received; and said data frame with the same DA, SA, TID and TXn is only accepted once; and when said device serves as said destination device and receives said data frame, a data response frame with the same DA, SA, TID and a corresponding locally stored FA, is generated and is sent out via said frame transceiver and said wireless transceiver; said data response frame further contains a data response frame sequence number RXn, and the RXn is consistent with a TXn of the corresponding said data frame, when said data response frame is initiated or received, a value of the RXn is correspondingly recording in a local storage; when said device serves as an intermediate device, whose locally stored FA comparing with that of in the frame is as that of in the next upper level and corresponding locally stored DA, SA, TID are matching and corresponding RXn is just smaller than that of in the frame by 1, said data response frame is received and forwarded, before forwarding, a FA in the frame is replaced by a locally stored FA; when said device serves as said transaction initiator, said data response frame is received; and said data response frame with the same DA, SA, TID and RXn is only accepted once; and under the same said transaction event identification TID, the above operations can be continuously performed for multiple times, and 1 is added to the TXn every time before performing.

18. The device of forward addressing and backward readdressing interconnect according to claim 17, wherein in said data stage, said data processing hardware further comprises: a length of said data frame sequence number TXn and a length of said data response frame sequence number RXn are 16 bits, $0 \leq TXn < 2^{16}-1$, $0 \leq RXn < 2^{16}-1$, and said transaction initiator sets TXn from 1 for sending out said data frame; said data frame and said data response frame further contain a MAC address of a transmitting device TA; said data frame and said data response frame can select whether a datagram is carried, a length of the datagram is variable of 0-64 kilobit; further when said device serves as an intermediate device, which is adjacent to said transaction initiator and has a same BA as said transaction initiator and whose locally stored DA, SA, TID are matching and corresponding TXn is just smaller than that of in the frame by 1, said data frame is forwarded; when said device serves as an intermediate device, which is at a next lower level of said destination device BA and whose locally stored DA, SA, TID are matching and corresponding TXn is just smaller than that of in the frame by 1, said data frame is forwarded to an intermediate device with a same level BA thereof; and when said device serves as an intermediate device, which is adjacent to said destination device and has a same FA as said destination device and whose corresponding locally stored DA, SA, TID are matching and corresponding RXn is just smaller than that of in the frame by 1, said data response frame is forwarded;

when said device serves as an intermediate device, which is at a next lower level of said transaction initiator FA and whose corresponding locally stored DA, SA, TID are matching and corresponding RXn is just smaller than that of in the frame by 1, said data response frame is forwarded to an intermediate device with a same level FA thereof.

19. A system of forward addressing and backward readdressing interconnect, wherein the system comprises devices of forward addressing and backward readdressing interconnect according to claim 10.

* * * * *